United States Patent
Shahaf et al.

(10) Patent No.: US 6,490,645 B1
(45) Date of Patent: Dec. 3, 2002

(54) OPTIMIZED RANDOM ACCESS SCHEME FOR A SHARED RESPONSE

(75) Inventors: Mark Shahaf, Ashdod (IL); Salomon Serfaty, Doar Gaash (IL); Rafael Carmon, Holon (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/511,441

(22) Filed: Feb. 23, 2000

(30) Foreign Application Priority Data

Nov. 11, 1999 (GB) ................................ 9926728

(51) Int. Cl.$^7$ ............................................. G06F 13/14
(52) U.S. Cl. ....................... 710/244; 710/240
(58) Field of Search ........................ 710/240–244, 710/124, 115–119

(56) References Cited

U.S. PATENT DOCUMENTS 4,161,786 A * 7/1979 Hopkins et al.
5,301,332 A * 4/1994 Dukes

* cited by examiner

Primary Examiner—Peter Wong
Assistant Examiner—Kim Huynh
(74) Attorney, Agent, or Firm—Steven R. Santema

(57) ABSTRACT

A method by which a plurality of users share access to a resource such as a common communications channel. Each user is assigned a priority and is provided with a non-uniform probability distribution function corresponding to that priority, with the sum of the several non-uniform probability distribution functions being uniform. Whenever a user wishes to access the resource, the user selects a random number according to its non-uniform probability distribution function and computes an access time based on the selected random number.

4 Claims, 2 Drawing Sheets

US 6,490,645 B1

OPTIMIZED RANDOM ACCESS SCHEME FOR A SHARED RESPONSE

FIELD OF THE INVENTION

The present invention relates to a method of allocation of a shared resource between multiple uncoordinated users, and more particularly, to the situation in which users are of different priority levels.

BACKGROUND OF THE INVENTION

There are many well known systems in which multiple users share a common resource in a way which can lead to conflict. These systems are known in the art as contention systems and include, but not exclusively, examples such as the sharing of memory between different peripherals inside a microprocessor, the sharing of a digital bus between different digital components connected to it, sharing of a multi-drop line connecting a group of computer terminals, or the sharing of a radio communications network.

There are two types of methods of resolving conflicts among multiple users: centralized schemes and distributed schemes. In a centralized scheme, a central site acts a moderator, providing a single point of coordination. An example of a centralized scheme is polling. The central site sends a message to each terminal in turn, giving it permission to transmit. Although the scheme is simple, there is added delay because the central site is involved in every single transfer. In addition, as the number of terminals becomes high, the full polling cycle increases to a level unacceptable to most users of interactive terminals. Finally, if only a fraction of the possible terminals are logged in at a particular moment, polling is particularly inefficient. Polling is not applicable to modern radio networks.

In a distributed scheme, all terminals are peers. Distributed systems have lower message delays and allow higher network utilization than centralized systems but are more complicated. ALOHA is one type of distributed system where users transmit whenever they have some information to deliver. The user waits for an acknowledgment. If no acknowledgment is received, a collision between transmissions of more than one sender is assumed. The user will wait a random time and then will retransmit. For pure ALOHA the transmission occurs as soon as transmit request is issued while for slotted ALOHA, the time axis is divided into slots and the terminal will wait for transmission until the beginning of the next slot.

Multiple access systems can be evaluated based on two metrics, 1) normalized throughput which is equivalent to the fraction of link capacity used to carry non-retransmitted packets of data, and 2) mean delay which is the amount of time that a terminal has to wait before it successfully transmits a packet. The normalized throughput is inversely dependent on collision probability. The mean delay is directly dependent on the mean access delay which is the mean waiting time in case of retransmission. In order to minimize the repetitive collision probability (maximize throughput), retransmissions should be spread out uniformly over the retransmission period, i.e. the random access delay in case of retransmission should have a uniformly distributed characteristic over the retransmission period. A uniform distribution f (x) is characterized by the equation:

$$f(x)=0 \text{ for } x<L_1, x \geq L_2; f(x)=1/(L_2-L_1) \text{ for } L_1 \leq x < L_2 \quad (1)$$

where $L_1$ and $L_2$ define the boundaries of the retransmission period

The size of the retransmission period is a tradeoff between collision probability and mean access delay.

Radio standards require that the random access delay in case of retransmission should be uniformly distributed. The TETRA standard (ETS 300 392-2) which is the pan-European standard for Trunked Radio Systems that are wholly digital utilizes this type of distribution.

Although in pure ALOHA or slotted ALOHA, using the uniformly spread out retransmissions will maximize overall throughput, these schemes do not address the case when some users should have higher priority. Reservation ALOHA, where slots are reserved for specific terminals, can give certain users higher priority, but the system does not perform as well as slotted ALOHA.

The SAE J1708 re-try protocol, proposes changes in the random retry time by a weighting factor which depends on a predetermined priority of different classes of users. Because the overall distribution is not uniform, the utilization of the retransmission interval is sub-optimal. In TETRA and other systems providing two-way radio communications, such sub-optimal use of the resource results in longer call setup delays and a degraded system performance. There is thus a widely recognized need for, and it would be highly advantageous to have, a method of sharing a resource among multiple uncoordinated users that allows higher priority users to have a lower mean access delay of retransmission while the overall randomization process preserves its uniformly distributed characteristic.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method of allowing higher priority users in a multi-user system to have a lower mean access delay of retransmission on a shared resource. Specifically, the present method can be used in a system where the overall randomization process of the random access in retransmission is uniformly distributed for maximum performance.

According to the present invention there is provided a method for sharing access to a resource by a plurality of users, including the steps of: (a) assigning each user a priority, at least two of the users having different priorities; (b) providing each user with a non-uniform probability distribution function corresponding to the priority of the each user, a sum of all the non-uniform probability distribution functions being uniform; and (c) for each user, computing an access time based on the non-uniform probability distribution function of the each user.

A user selects the time at which it accesses the resource by generating a random number in accordance with its assigned probability distribution function. The user's access time is a linear function of the random number that the user generates. The high priority probability distribution functions are skewed to generate earlier access times than the low priority probability distribution functions, so that high priority users are likely to have earlier access to the resource than low priority users. Unlike the probability distribution functions of the SAE J1708 re-try protocol, the probability distribution functions of the present invention are constrained so that their sum is uniform.

Preferably, each user is provided with a random number generator that generates uniformly distributed random numbers and with a transformation that transforms the uniformly distributed random numbers to random numbers that are distributed in accordance with the user's non-uniform probability distribution function. Whenever a user wants to access the resource, the user first generates a uniformly distributed number, using the provided random number generator, then transforms the uniformly distributed random number into a non-uniformly distributed random number, using the provided transformation, and finally transforms the non-uniformly distributed random number into an access time.

The principles and operation of the optimized random access scheme according to the present invention may be better understood with reference to the drawings and the accompanying description.

Figure 1:
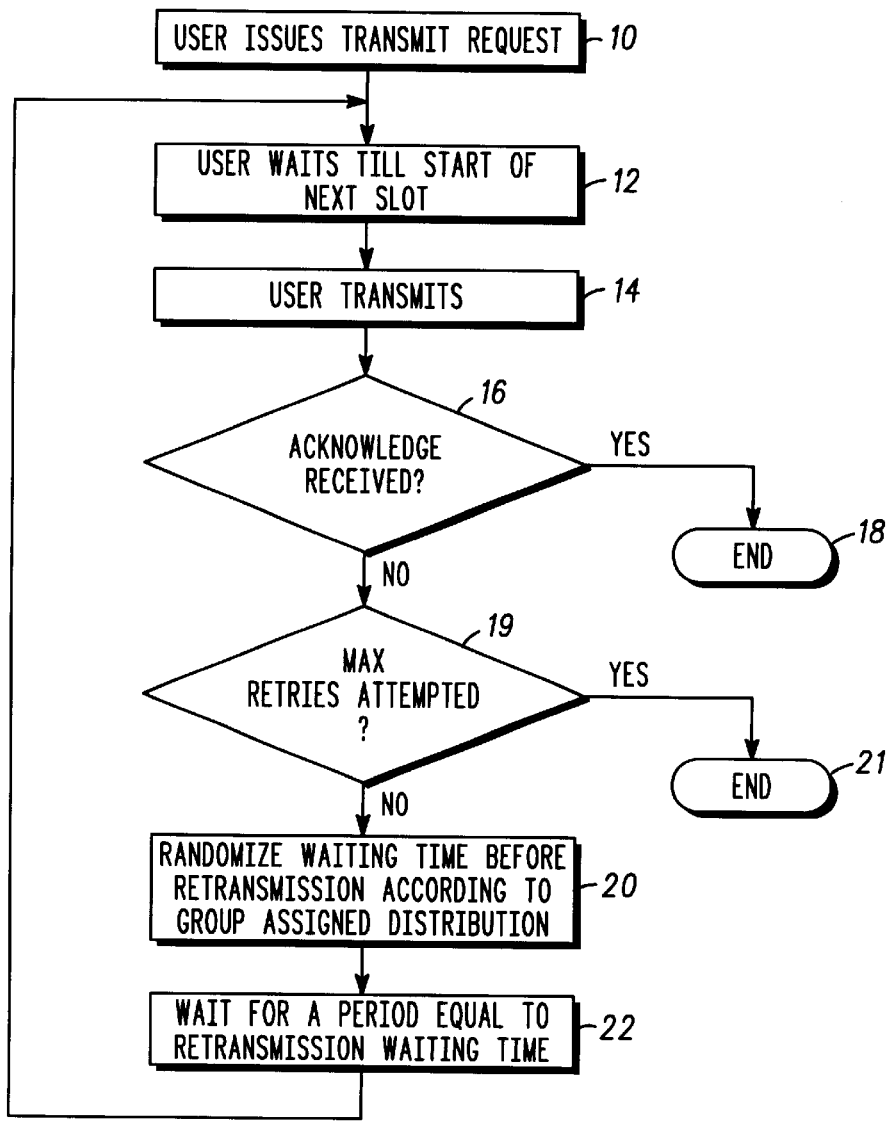
FIG. 1 is a flow chart of a sample procedure for optimizing the access to a shared resource of multiple users of different priority levels.

Referring now to the drawings, FIG. 1 is a flow chart of a procedure for optimizing the access to a shared resource of multiple users of different priority levels. Slotted ALOHA is assumed to be the access method. A user issues a transmit request when it wants to transmit (box 10), and waits until the start of the next time slot (box 12) At the next time slot (box 14), the user transmits its data. If the user receives an acknowledgment (box 16 and box 18), the user returns to receive mode. Otherwise, the user assumes that a collision has occurred. Provided that a predetermined number of retries have not already been attempted the user randomizes its waiting time before retransmission according to a group assigned distribution (box 20), waits both the retransmission waiting time (box 22) and till the start of the next time slot, beginning the procedure anew. If a pre-defined number of retries have already occurred, the random access attempt is instead aborted (boxes 19 and 21). In the case where a regular ALOHA access scheme is used in the place of slotted ALOHA, step (box) 12 is skipped, because access is continuous. In order to allow priority levels, different randomization techniques are used by different groups of users, i.e. each user group generates random numbers that are not uniformly distributed. However, the overall combination of all network users resembles the case in which all users have equal priority and equal probability of access, i.e. an overall uniform distribution.

The cumulative distribution function Fx(x) of a random variable X is the probability that a random variable takes on a value less than or equal to x; that is $$Fx(x)=P(x \leq x) \text{ with}$$

$$Fx(x) \geq 0, Fx(\infty)=1, Fx(-\infty)=0, \text{ and}$$

$$Fx(x_1) \leq Fx(X_2) \text{ for } x_1 \leq x_2 \quad (2)$$

The probability density function of a random variable X is the derivative of its cumulative distribution function. i.e.

$$\frac{d Fx(x)}{dx} = px(x) \quad (3)$$

It follows from the Fx(x) properties that $$\int_{-\infty}^{\infty} px(x) = 1,$$

and $$px(x) \geq 0$$

Let us assume a network with a population of N terminals. All the terminals under consideration are divided into K subsets where each subset contains one or more terminals. When an access to a shared resource takes place, here in the case of retransmission, let us define $prob_i$ as the probability that a member of a given subset i accessed the shared resource.

$Prob_i$ of subset i can be calculated based on the individual access probabilities of subset i's members. In the simplest case, where the probability of access for all users is identical, $prob_i$ of subset i is dependent on the number of users in subset i. If the probability of access for all users is not identical, the individual differences should be reflected in the group access probability $prob_i$ of subset i. The probability of access of each user can be determined based on a previously known statistical profile or can be derived based on accumulated statistical records which are periodically updated to reflect changes in user behavior.

When an access of the shared resource occurs, here in the case of retransmission, it must be one of the terminals of the K subsets which accessed it. Therefore, the access probabilities of the K subsets must satisfy the equation:

$$\sum_{i}^{k} prob_i = 1 \quad (4)$$

Assume that members of each of the K subsets randomize their waiting time before retransmission by their own access probability density function. Each of the K probability density functions are completely contained within the randomization interval, $\Re$ where $\Re=[L_1, L_2]$. Therefore each of the K access probability density functions are characterized by:

$$\forall i \in [1 \ldots K], \int_{L_1}^{L_2} p_i(t)dr = 1 \text{ where } r \in \Re \quad (5)$$

The probability that access of the shared resource after a random waiting time, $P_i(z)$ where $z \in [L_1, L_2]$ was accomplished by any member of a certain subset is given by:

$$\forall i \in [1 \ldots K], \forall z \in [L_1, L_2], P_i(z) = prob_i \int_{L_1}^{z} p_i(r)dr \quad (6)$$

In order for the random access scheme to be optimum, the overall random access should result in maximum entropy (maximum uncertainty). Maximum entropy will occur when the overall process, i.e. the probability that a terminal from any of the subsets has accessed the shared resource for retransmission after a random waiting time, will have similar statistical properties of the uniformly distributed random process over the random access interval $\mathfrak{R}$.

$$\forall z \in [L_1, L_2], \; P(z) = \int_{-\infty}^{z} \sum_{i=1}^{K} prob_i p_i(r) dr = \frac{z}{L_2 - L_1} \quad (7)$$

Figure 2:
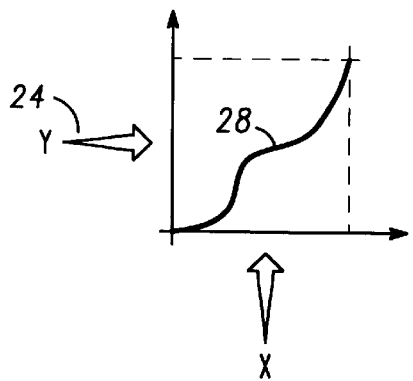
FIG. 2 is an illustration of a method of generating a probability density function for randomized waiting time before retransmission time.

FIG. 2 illustrates the method of generating a randomized waiting time before retransmission probability (or access probability) density function for a specific group of users of the same priority level (i.e. further detailing box 20 of FIG. 1). For the utilization of the method of the current invention, each user which is a member of a specific priority level has a random number generator 24 to generate uniformly distributed random numbers y. Methods for generating uniformly distributed random numbers are well-known in the art. See, for example, W. H. Press et al., *Numerical Recipes in C* (Cambridge University Press, 1992), Chapter 7, pp. 275–286. Each user also is provided with a transform function 28 which is a cumulative probability function, according to the required characteristic of the priority level group to which the user belongs. Transform function 28 is used to convert uniformly distributed random numbers y into random numbers t distributed according to the desired probability density function.

In the simplest embodiment of the present invention, the transform functions are pre-programmed for each user. In another embodiment, the transform functions, are adapted based on network statistical analysis, so as to change when the access probabilities $prob_i$'s are updated. In the case of adaptive transform functions, transform functions 28 preferably are provided in the form of a look-up table. The probability density function for each priority level group is designed first and foremost so as to optimize the overall access scheme i.e. that the sum of the probability density functions when normalized by subset access probabilities results in a uniform distribution. Additional considerations in the design of each subset's probability density function include ensuring that the mean value of the probability density function leads to the desired mean access time for the subset, and relating the overlap between subset probability density functions to specific network requirements. In general, the specific probability distribution functions used are determined by simulation and comparison to required performance.

Figure 3:
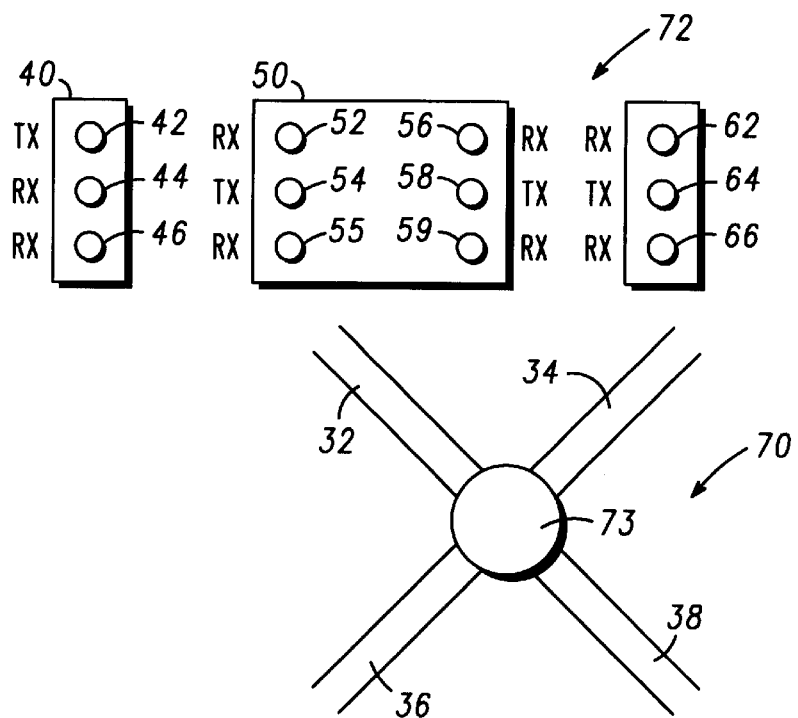
FIG. 3 is an illustration of an application of the present invention to the TETRA system.

FIG. 3 illustrates an application of the proposed method to the TETRA system. TETRA is defined as a time multiplexed system (TDMA="Time Division Multiple Access") with four independent transmission channels 32, 34, 36, and 38 per carrier 73. A group 72 of users is assigned channel 32 being a particular slot on RF carrier 73.

Assume that group 72 is divided into 3 subgroups: team leaders 40, team members 50, and support personnel 60. Team leaders 40 constitute ¼ of group 72, team members 50 constitute ½ of group 72 and support personnel constitute ¼ of group 72. At the end of a certain transmission, several group members 42, 54, 58, and 64 are competing for the next transmission control grant, which is assigned by the system 70 provided no collision is detected in the case of trunked mode TMO or by the last transmitter 46 in the case of direct mode DMO The members of group 72 use slotted ALOHA random access scheme in case of collision during the first access.

Figure 4:
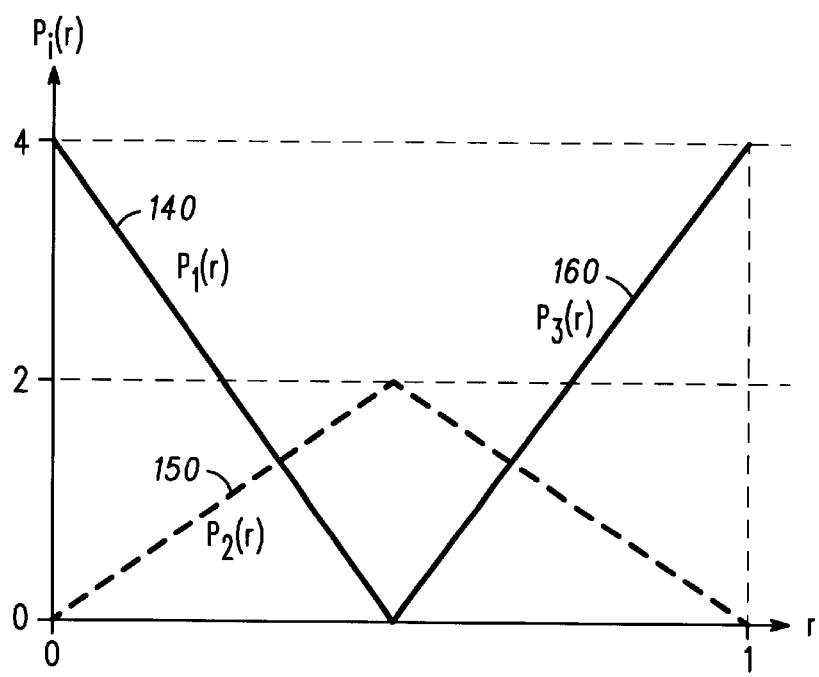
FIG. 4 is an illustration of the probability density functions corresponding to different priority levels for the application in FIG. 3.

Assume that terminals 42, 54, 58 and 64 attempt to transmit at the same time, and that the transmissions of terminals 42, 54, 58, and 64 collide. Terminals 44, 46, 52, 55, 56, 59, 62, and 66 remain in receive mode. Because there is no way of knowing which terminals collided, all subgroups 40, 50, and 60, as in the case of any collision, randomize their waiting times for retransmission according to their respective probability density function, 140, 150, and 160 shown in FIG. 4. Note that the random access interval $\mathfrak{R}$ in FIG. 4 is normalized to equal [0,1]. As explained above with reference to FIG. 2, each of the members of subgroups 40, 50, and 60 uses a uniformly distributed random number generator 24 to generate a uniformly distributed random number y which is transformed by subgroup-specific transform function 28 into a different random number t from a distribution whose probability distribution function is a non-uniform probability density function. Value t, which is normalized over the interval [0,1], must then be mapped onto the non-normalized interval $[L_1, L_2]$ to give the waiting time T for retransmission: $T = L_1 + t(L_2 - L_1)$.

According to our earlier notation:

$$prob_1 = 1/4$$

$$prob_2 = 1/2$$

$$prob_3 = 1/4$$

$$p_1(r) = -8r + 4 \quad r \in [0, 1/2]$$
$$\phantom{p_1(r) =} 0 \quad r \notin [0, 1/2]$$

$$p_2(r) = 4r \quad r \in [0, 1/2]$$
$$\phantom{p_2(r) =} -4r + 4 \quad r \in [1/2, 1]$$

$$p_3(r) = 8r - 4 \quad r \in [1/2, 1]$$
$$\phantom{p_3(r) =} 0 \quad r \notin [1/2, 1]$$

For terminal 42 which is a member of subgroup 40, its total access probability (according to equation 6) is equivalent to:

$$P_1(z) = prob_1 \int_0^z p_1(r) dr = \frac{1}{4} \int_0^z -8r + 4 = -z^2 \quad \text{for } z \in [0, 1/2] \quad (8)$$
$$\phantom{P_1(z) =} 0 \quad \text{for } z \notin [0, 1/2]$$

Terminals 54 and 58 similarly have access probability of $$P_2(z) = prob_2 \int_0^z p_2(r) dr = \frac{1}{2} \int_0^z 4r = z^2 \quad \text{for } z \in [0, 1/2] \quad (9)$$
$$= \frac{1}{2} \int_0^{1/2} 4r + \frac{1}{2} \int_{1/2}^z -4r + 4 = -z^2 + 2z - 1/2 \quad \text{for } z \in [1/2, 1]$$
$$\phantom{=} 0 \quad \text{for } z \notin [0, 1]$$

Terminal 64 has access probability $$P_3(z) = prob_3 \int_{1/2}^z p_3(r) dr = \frac{1}{4} \int_{1/2}^z 8r - 4 = z^2 - z + 1/4 \quad \text{for } z \in [1/2, 1] \quad (10)$$
$$\phantom{P_3(z) =} 0 \quad \text{for } z \notin [1/2, 1]$$

From equations (8), (9), and (10), it is apparent that a member of subgroup 40 (i.e. terminal 42) is more likely to be granted retransmission first prior to a member of subgroups 50 and 60, even though two terminals from subgroup 50 are attempting retransmission. Although over the entire random access interval R=[0,1], members of subgroup 50 will still have a higher probability of access than subgroups 40 and 60 (½ vs. ¼), subgroup 50's probability density function 150 causes its probability of access to be more evenly spread over the entire random access interval, while higher priority subgroup 40's probability of access, although less overall, is more densely concentrated at the beginning of the random access interval. In the above example, only one member of subgroup 40 is competing for retransmission. If more than one member of subgroup 40 had been competing, it would be of no importance to the method which of them would be granted the right of first transmittal.

Substitution of equations (8), (9) and (10) into equation (7) remembering that equation (9) has its probability made up of 2 parts yields $$\forall z \in [0,1] P(z) = -z^2 + z + 1/2z^2 - 1/2z^2 + z - 1/4 + z^2 - z + 1/4 \qquad (11)$$

Because $L_2 - L_1$ here is 1, $P(z)$ of the overall random access process for retransmission is uniformly distributed for optimum utilization of the randomization interval.

The transform curves 28 corresponding to these non-uniform probability distribution functions are obtained by methods well-known to those skilled in the art. For example, the transform curve $t_1$ for probability distribution function $p_1$ is a function of a uniformly distributed (on [0,1]) random variable y such that the area under $p_i(r)$ between 0 and $t_1$ is equal to y:

$$\int_0^{t_1} (-8r + 4) dr = y$$

or, $-4t_1^2 + 4t_1 = y$. Solving this quadratic equation for $t_1$ gives:

$$t_1(y) = \frac{1 - \sqrt{1-y}}{2}$$

This function of y transforms uniformly distributed random numbers y into random numbers having the probability distribution function $p_1(y)$.

Although the present invention is described above in terms of cellular communications, the method of allowing higher priority users in a multi-user system to have a lower waiting time, while maintaining a uniformly distributed overall randomization, can also be used in queuing design. For example, assume that a system accepts calls from clients of two priority types. The system would want to favor its higher priority clients but not exclusively. Therefore, in accordance with the present invention, the system assigns to each group of clients a different random number generator and probability density function, so that preferred clients generally have a shorter waiting time.

While the invention has been described with respect to a limited number of embodiments, it will be appreciated that many variations, modifications and other applications of the invention may be made.

What is claimed is:

1. A method for sharing access to a resource by a plurality of users, comprising the steps of:

(a) assigning each user a priority, at least two of the users having different priorities;

(b) providing each user with a non-uniform probability distribution function corresponding to said priority of said each user; and (c) for each user, computing an access time based on said non-uniform probability distribution function of said each user; characterized in that a sum of all said non-uniform probability distribution functions is uniform.

2. The method of claim 1, wherein, for each user, said computing of said access time is effected by steps including:

(i) generating a first random number according to said non-uniform probability distribution function of said each user, and (ii) transforming said first random number into said access time.

3. The method of claim 2, wherein said transformation is a linear transformation.

4. The method of claim 2, wherein said generating of said first random number is effected by steps including:

(A) generating a second random number according to a uniform distribution, and (B) transforming said second random number into said first random number.

* * * * *